United States Patent [19]

Wakefield et al.

[11] 3,880,807

[45] Apr. 29, 1975

[54] REACTION OF FURFURALDEHYDE AND PYROLYSIS OIL TIRE SCRAP

[75] Inventors: Lynn Burritt Wakefield; Durward Thomas Roberts, Jr.; Edward Leo Kay, all of Akron, Ohio

[73] Assignee: The Firestone Tire & Rubber Company, Akron, Ohio

[22] Filed: Mar. 16, 1973

[21] Appl. No.: 342,245

[52] U.S. Cl.............. 260/51 R; 260/3; 260/4; 260/53 R; 260/56; 260/57 R; 260/62; 260/67 R; 260/67 F; 260/67 A; 260/67 UA; 260/73 R; 260/710; 260/720; 260/887
[51] Int. Cl......... C08g 5/00; C08g 5/04; C08g 7/00
[58] Field of Search.............. 260/4, 51 R, 53 R, 56, 260/57 R, 62, 67 UA, 67 A, 67 R, 73 R, 710, 720

[56] References Cited
UNITED STATES PATENTS

| | | | |
|---|---|---|---|
| 1,986,050 | 1/1935 | Fairley | 260/720 |
| 2,871,205 | 1/1959 | Mankowich et al. | 260/710 |
| 3,231,544 | 1/1966 | Cotman et al. | 260/67 A |
| 3,809,680 | 5/1974 | Wakefield | 260/51 R |

Primary Examiner—Murray Tillman
Assistant Examiner—J. Ziegler

[57] ABSTRACT

The invention relates to a resinous rubber tackifier and stabilizer prepared by a catalyzed reaction of a furfuraldehyde and pyrolysis oil obtained by the destructive distillation of scrap tire vulcanizate.

2 Claims, No Drawings

REACTION OF FURFURALDEHYDE AND PYROLYSIS OIL TIRE SCRAP

The invention relates to the production of a solid resin by the reaction of formaldehyde or other aldehyde with oil obtained from the pyrolysis of vulcanized tire scrap, and the use of the resin as a tackifier and/or an antidegradant in the compounding of natural and synthetic rubbers.

Wakefield Ser. No. 236,438 filed Mar. 20, 1972, now U.S. Pat. No. 3,809,680 relates to hard resins prepared by reacting an aldehyde with the tire pyrolysis oil. Also, it has been known that some aromatic hydrocarbons, including m-xylene, anthracene and acenaphthene react with formaldehyde and other furfuraldehyde under the influence of a Friedel-Crafts catalyst to form alkylol-aromatic compounds which may be further reacted to produce resins used in the paint and rubber industries.

It has now been determined that resins obtained by the catalyzed reaction of an aldehyde on pyrolysis oil from vulcanized tire scrap, can be used as a useful rubber-compounding ingredient.

The composition of tire scrap varies considerably, the principal variation being in the elastomers and the mineral components of the scrap. There are several elastomers used widely in tires, namely, natural rubber, polyisoprene, polybutadiene, butadiene-styrene copolymer, polyisbutylene (Butyl), chlorinated Butyl, ethylene-propylene copolymers and terpolymers. The scrap to which industry refers as tire scrap is one in which the elastomer content is over about 25 per cent by weight of the vulcanizate of such rubbers, and may or may not contain fabric. During the distillation of the scrap the mineral matter remains as a residue and, of course, some of the elastomer is charred, but a high percentage of oil distillate is obtained which is referred to herein as tire pyrolysis oil.

The distillate is derived from the elastomer present in the scrap and from oil that may be present in the scrap that is pyrolyzed. This oil may be aliphatic, aromatic or naphthenic. The composition of the distillate will vary with the temperature at which the pyrolysis is carried out and the dwell time of the scrap at the pyrolysis temperature. Usually the pyrolysis temperature will be between 1000° and 2500° F., but may be somewhat higher. The scrap is maintained at this temperature for a sufficient time to remove substantially all of the oil in the vapor state. At the higher pyrolysis temperatures the tendency is for the aromatic content of the distillate to be increased. There is little or no oil in may rubber compounds, but in other rubber compounds the oil content may run as high as 25 per cent. In the ordinary tire pyrolysis oil, the distillate derived form that oil which has been compounded with the rubber before vulcanization will be found in the heavy fraction of the distillate.

The Bureau of Mines Report of Investigation 7302 "DESTRUCTIVE DISTILLATION OF SCRAP RUBBERS", September 1969, gives the following analysis of tire pyrolysis oils distilled at different temperatures:

TABLE I

ANALYSIS OF DISTILLATE OIL

| | CALCINATION TEMPERATURE, °C. | |
|---|---|---|
| | 500 | 900 |
| VOLUME, % | | |
| Acids | 1.6 | 5.5 |
| Bases | 2.2 | 1.2 |
| Neutral Oil | 56.6 | 63.2 |
| NEUTRAL OIL ANALYSES VOLUME % | | |
| Olefins | 15.5 | 13.0 |
| Aromatics | 51.5 | 84.8 |
| Paraffins and Naphthenes | 33.0 | 2.2 |

There is a hig percentage of neutral oils in the distillate and a small amount of acids and bases. The analysis shows that there is a high percentage of aromatics present. The aldehyde treatment tends to condense the aromatics as well as react with the olefins and possibly with the naphthenes.

The Bureau of Mines Report also gives a Mass Spectrometric analysis of the distillate oil as follows:

TABLE II

MASS SPECTROMETRIC ANALYSIS OF OIL

| | CALCINATION TEMPERATURE, °C. | |
|---|---|---|
| | 500 | 900 |
| VOLUME,% | | |
| Alkyl Benzenes | 19.0 | 20.5 |
| Phenols | 1.0 | 0.9 |
| 3-Ring Aromatics | 1.5 | 2.4 |
| Biphenyl and Acenaphthene | 6.1 | 8.5 |
| Alkyl Naphthalenes | 8.9 | 29.7 |
| Indenes | 6.8 | 8.5 |
| Styrene | 2.0 | 4.5 |
| Alkylstyrenes and Indans | 11.2 | 5.8 |

Tire purolysis oils which have analyses of different components in about these ranges are representative of those which can be used in carrying out the invention.

Formaldehyde and the other aldehydes react with the foregoing compounds.

Generally, oil recovered from pyrolysis of scrap rubber at higher temperatures will contain a higher content of aromatics thatn the oil obtained at lower temperatures. Such oils of higher aromatic content, are preferred for the preparation of resins of this invention.

It is known that oil derived from the pryrolysis of different rubbers varies in its content of chemical which react with formaldehyde and other aldehydes to produce a solid resin. Five to fifty parts by weight of aldehyde may be used per 100 parts of tire pyrolysis oil in the production of the resin. Commercially, tire pyrolysis oils which yield at least 50 per cent of such solid resin are preferred for use in the process of this invention.

The preferred aldehyde for commercial operations is formaldehyde or a formaldehyde "generator" such as paraformaldehyde, but other aliphatic, aromatic and heterocyclic aldehydes may be used, including acetaldehyde, propionaldehyde, benzaldehyde, tolualdehyde, furfural, etc.

Based on the foregoing, and considering the variation in the compositions of tire scraps and the effect of calcination temperature on the pyrolysis oil, the tire pyrolysis oil of this invention will preferably have the following analysis in percentages by volume:

TABLE III

|  | PER CENT |
| --- | --- |
| Alkyl Benzenes | 15–25 |
| Phenols | 0.1–5 |
| 3-Ring Aromatics | 0.1–5 |
| Biphenyl and Acenaphthene | 5–25 |
| Alkyl Naphthalenes | 5–35 |
| Indenes | 1–20 |
| Styrene | 1–15 |
| Alkylstyrenes and Indans | 1–25 | although it is not intended to limit the invention to oils of this composition. However, the oil will contain a total of at least 25 per cent by volume of (1) alkyl benzenes, (2) alkyl naphthalenes, and (3) biphenyl and acenaphthene. Any such pyrolysis oil may be used in carrying out the invention. Resin-precursor oils from other sources may be added to the tire pyrolysis oil without departing from the teaching of the invention.

The reactions of formaldehyde with a wide variety of aliphatic and aromatic compounds are known. The invention relates to the reaction of formaldehyde or other aldehyde with a plurality of the pyrolysis oil components to produce a valuable solid resin suitable for use as a rubber-compounding ingredient, the analysis of which will vary from resin to resin, but the composition of the pyrolysis oil does not vary so much as to produce a wide variance in the properties of the resins that are obtained.

Commercially, a Friedel-Crafts catalyst may be preferred because it is known that it speeds alkylation reactions. Catalysts which may be used advantageously include boron trifluoride complexes such as the alkyl ethers, hydrate, phenolate; anhydrous aluminum chloride, zinc chloride, etc.; a protonic acid, e.g. sulfuric acid, p-toluene-sulfonic acid, etc.; sulfur- and phosphorous-bridging condensation catalysts including a chloride or oxychloride of sulfur, e.g. sulfur mono- or dichloride, thionyl chloride, sulfuryl chloride, etc. or of phosphorous, e.g. phosphorous trichloride, phosphorous pentachloride, phosphorous oxychloride, etc.

The reactions of this invention catalyzed by the commercial catalysts take place at a low temperature of the order of $-25°$ C. However, such reactions are slow and higher temperatures are preferred; for example, from ambient temperatures to $250°$ C. The reactions may be carried out in any suitable reaction vessel on either a batch or continuous basis.

The following is illustrative of the formaldehyde treatment of an oil obtained from vulcanized scrap tire pyrolysis. The oil used is representative of what would be obtained in commercial production from a usual vulcanized tire scrap at any usual pyrolysis temperature, the pyrolysis being carried out in the substantial absence of air.

PREPARATION OF PYROLYSIS OIL

Scrap pneumatic tires which were not useful for retreading were cut into pieces and then pyrolyzed in a horizontal calciner at temperatures of $1200°$, $1400°$, $1600°$ and $1800°$ F. The pyrolysis oils generated during the pyrolyses were combined. The final blend produced by blending oils obtained over a practical range of pyrolysis temperatures, may be assumed to be statistically typical of large-volume production.

The analysis of tire pyrolysis oil given in Table III is typical and the analysis of the oil obtained by the foregoing procedure should come within this analysis, and such typical oils used in the production of resins as here described, should yield resins comparable to those described in Table IV which follows.

PRODUCTION OF TACKIFIER AND ANTIDEGRADANT RESIN

The general procedure for preparing the resins of this invention was to charge a glass pressure bottle with the pyrolysis oil and the aldehyde (usually paraformaldehyde but other aldehydes would be effective) and finally the catalyst was added. The pressure bottle was sealed and rotated end-over-end in an $80°$ C. water bath for 16 to 23 hours. The pressure bottle was then removed, cooled to room temperature, opened, and the contents diluted with toluene. (Methylethyl ketone or other solvent may be used.) The diluted reaction mixture was treated with an excess of solid dry sodium carbonate to neutralize the catalyst residues and the mixture subjected to vacuum distillation. All material distilled up to $190°$ C. at 4 mm. pressure was discarded. The hot residue was poured into an aluminum foil cup and allowed to cool. In Table IV the yield of product is expressed as a weight percentage of the complete charge. The products were hard (H) to hard-brittle (HB) in physical appearance. The results of a series of runs are summarized in Table IV.

TABLE IV

| RUNS: | 1 | 2 | CONTROLS AND EXPERIMENTAL RESINS | | | | | | | | | | | | |
| --- | --- | --- | --- | --- | --- | --- | --- | --- | --- | --- | --- | --- | --- | --- | --- |
| | | | 3 | 4 | 5 | 6 | 7 | 8 | 9 | 10 | 11 | 12 | 13 | 14 | 15 |
| OILS: | | | | | | | | | | | | | | | |
| Dutrex 726 | 100 | 100 | | | | | | | | | | | | | |
| Whole Pyrolysis Oil | | | | 100 | 100 | 100 | 100 | 100 | 100 | 100 | 100 | 100 | 100 | 100 | |
| Volatile Fraction | | | | | | | | | | | | | | | 65 |
| Non-Volatile Fraction | | | 100 | | | | | | | | | | | | 35 |
| ALDEHYDES: | | | | | | | | | | | | | | | |
| Paraformaldehyde | 20 | 20 | | 20 | 20 | 20 | 20 | 20 | 20 | 20 | 20 | 20 | | | 20 |
| Furfuraldehyde | | | | | | | | | | | | | | 20 | |
| CATALYSTS: | | | | | | | | | | | | | | | |
| BF$_3$ Etherate | 5 | | | | | | | | | | | 5 | 5 | | 5 |
| S$_2$Cl$_2$ | | | | | 5 | | | | | | | | | | |
| SOCl$_2$ | | | | | 5 | | | | | | | | | | |
| SO$_2$Cl$_2$ | | | | | | 5 | | | | | | | | | |
| PCl$_3$ | | | | | | | 5 | | | | | | | | |
| PCl$_5$ | | | | | | | | 5 | | | | | | | |
| OCl$_3$ | | | | | | | | | | | | | | | |
| H$_2$SO$_4$ | | | 5 | | | | | | | 10 | | | | | |
| p-Toluene sulfonic acid | | | | | | | | | | | 10 | | | | |
| P$_2$O$_5$ and O$_2$ | | | | | | | | | | | | | | 0.5 | |

TABLE IV—Continued

| RUNS: | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| CONTROLS AND EXPERIMENTAL RESINS | | | | | | | | | | | | | | | |
| CONDITIONS AND RESULTS: | | | | | | | | | | | | | | | |
| Time, Hrs. | | | | 22 | 22 | 22 | 16 | 16 | 22 | 23 | 23 | 16 | | | 23 |
| Yield, % | | | 35 | 41 | 51 | 49 | 58 | 53 | 49 | 63 | 58 | 49 | | | 58 |
| Nature of Product | VO | VO | VO | HB | H | H | H | H | H | HB | HB | HB | H | HB | HB |

Runs 1 and 2 of the foregoing table were included as points of reference. Dutrex 726 is a processing oil of high aromatic content which is used widely in the rubber industry. As will be noted in Table IV, treatment of the Dutrex 726 oil according to the general procedure of our invention resulted in a viscous oil (VO) rather than a hard resin. This indicates that pyrolysis oil as herein defined is unique, and on treatment with an aldehyde yields a very different product from that produced from Dutrex 726 which was not suitable as a resin for rubber compounding.

Run No. 3 indicates that if the pyrolysis oil is stripped of the volatile fraction (material that distills below 190° C. at 4 mm. pressure), the amount of residue amounts to about 35 per cent of a viscous oil based on the whole pyrolysis oil. This product could not be used as a tackifier resin.

Runs Nos. 4 through 12 illustrate that sulfur chlorides and oxychlorides as well as phosphorous chlorides and oxychlorides, Friedel-Crafts catalyst (e.g. $BF_3$ etherate), and also protonic acids (sulfuric and paratoluenesulfonic acids, etc.), in the amounts by weight given are effective catalysts for formation of resins. Different amounts of catalyst may be used in the resin reaction.

Run No. 13 shows that oxidation by blowing the whole pyrolysis oil with air, using phosphorous pentoxide as catalyst, gives a hard resin, and this may be used as a rubber tackifier. Other catalysts than phosphorous pentoxide may be used.

Run No. 15 was included to illustrate that the pyrolysis oil may be added incrementally (the low volatile oil first, and then the non-volatile fraction) to the reaction mixture to obtain good results. In this run a sample of tire pyrolysis oil from the blend described above was separated into two fractions by vacuum distillation. The volatile fraction comprised all material distilling up to a boiling point of 190° C. at 4 mm. pressure. It amounted to about two-thirds of the total charge. When freshly distilled it is a clear yellow liquid, and on standing turns dark brown. The residue, about one-third of the total, is a viscous black oil.

The volatile fraction, about 65 grams, was charged with 20 parts of paraformaldehyde to a glass pressure bottle, 5 parts of $BF_3$ etherate was added and the bottle was sealed and rotated end-over-end in an 80° C. water bath for 16 hours. The bottle was then removed, cooled to room temperature and opened. Then 35 grams of the distillation residue was added. The bottle was again sealed and agitated at 80° C. for an additional 7 hours. As will be noted in Table IV, the yield was 58 per cent of a hard-brittle (HB) resin. Comparing this with the yield obtained from the whole volatile fraction (Run No. 12) using the same catalyst, it is found that a substantially greater yield was obtained, indicating that incremental addition is commercially desirable. The light-oil increment added first might be larger or greater than 65 per cent as, for example, anything over 30 or 40 or 50 per cent, or even 70 per cent, more or less.

Run No. 14 is included to illustrate that other aldehydes are applicable, specifically furfuraldehyde. Formaldehyde or paraformaldehyde is less expensive and thus there is a commercial advantage in using either of them. Resins prepared with furfuraldehyde do have less tendency to stain and may be preferred on this basis.

This invention is not limited in scope by the general procedures described above. It should be obvious to one skilled in the art that the catalyst, aldehyde or pyrolysis oil may be added in increments to the reaction mixture. The process may be conducted in a batchwise manner or continuously. The temperature may be lowered and the reaction time extended, or the temperature increased and the reaction time lowered to produce useful tackifying resins without departing from the intent of our invention.

The tackifiers and stabilizers of this invention are useful additives in rubbers used in tires, mechanical goods and other rubber products.

RUBBER COMPOUNDS

In the following table the different pyrolysis oils and catalysts used in producing resins are those described in Table IV under the Run numbers given in the first line of Table V. All resins were compounded at a 17 parts per hundred of rubber level.

TABLE V

| RUN NO. | MONSANTO RHEOMETER DATA | | | | | |
|---|---|---|---|---|---|---|
| | 1 | 2 | 3 | 4 | 5 | 6 |
| RUBBER COMPOUND PLUS RESIN: | | | | | | |
| Control[a] | | | | | | |
| Exp. Resin No.[b] | — | 4 | 10 | 13 | 14 | 15 |
| Monsanto Rheometer[c] | | | | | | |
| TS[d] | 14.2 | 10.3 | 11.00 | 12.6 | 11.0 | 10.6 |
| TC(90)[e] | 21.6 | 16.3 | 16.7 | 19.3 | 16.4 | 16.1 |
| Cure Rate Index[f] | 13.5 | 16.7 | 17.5 | 14.6 | 18.5 | 18.2 |

[a] Commercial resin: Piccopale 100.
[b] Experimental Resins designated by Run Numbers in Table IV.
[c] Tested at 300° F., 1° Arc and 100 rpm.
[d] TS = Scorch time in minutes.
[e] TC(90) = Time to optimum cure in minutes.

(f) $\frac{1}{TC(90)-TS} \times 100$ = Cure Rate Index.

In compounding these resins with rubbers, from 1 to 25 parts by weight may be used in 100 parts of rubber. The amount of any particular resin used in different rubbers may vary widely.

Table V gives Monsanto Rheometer data on rubber compounds using several of the resins described in Table IV. The Monsanto Rheometer is a well-known commercial instrument for determining rate of cure of rubber compounds.

The compounds as summarized in Table V were prepared by mixing with the base formula, 17 parts per hundred (phr) of a commmercial resin (Piccopale 100) as a control, and in the test runs 17 phr of the experimental resins identified in the table by run numbers which refer back to Table IV. The base formula consisted of a commercial styrene-butadiene rubber plus some natural rubber and the usual amounts of carbon black, zinc oxide, stearic acid, sulfur and accelerator. Runs Nos. 2 through 6 of Table V indicate that the experimental resins imparted less scorch resistance to the rubber compounds than the control referred to in Run No. 1 and the cure rates were faster. Therefore, the time to optimal cure was in all cases less than that for the control. The faster cure rates of the experimental formulations are also indicated by the cure-rate indices; the higher the number the faster the cure rate. A higher cure-rate index is desirable from a commercial standpoint, since rubber compounds can be produced faster; thus realizing a lower unit cost.

Test data were not run on all of the examples identified in Table V, but only illustrative samples were selected, and the results obtained with these are representative of what may be obtained with any of the other samples identified in Table IV.

The resins of this invention impart tack and green strength to rubber compounds with results comparable to commercially available resins.

Tack or more specifically "building tack" is a desirable property which some synthetic elastomers lack. Simply stated, tack is a measurement of the ability of two compounded rubbers to stock together during fabrication and prior to vulcanization or curing.

"Green strength" is also an important factor during the manufacture of rubber articles (tires, mechanical goods, etc.); it is a measure of the uncured compound's ability to retain its geometric shape.

As shown by the data summarized in Table VI, the experimental resins impart tack and green strength values equivalent to or slightly better than a commercial resin (designated "control resin" in the Table).

Resin A was prepared by the general procedure described previously using $BF_3$ etherate as a catalyst. Resin B was also prepared by the general procedure except the resin was heated only 3 hours under pressure at 80° C. rather than 16 hours.

TABLE VI

HYDROCARBON RESINS FROM PYROLYSIS OIL

| | CONTROL RESIN | EXPERIMENTAL RESIN A | B |
|---|---|---|---|
| Wind-up Tack | | | |
| X versus X, lbs./In. | 4.6 | 5.4 | 6.6 |
| O versus O, lbs./In. | 6.6 | 7.8 | 8.8 |
| Average, lbs./In. | 5.6 | 6.6 | 7.7 |
| Instron Green Stress-Strain | | | |
| Initial, lbs. | 3.2 | 3.6 | 3.5 |
| Peak, lbs. | 3.2 | 3.6 | 3.5 |
| Break, lbs. | 0.4 | 0.6 | 0.8 |
| % Elongation | 570 | 620 | 790 |
| Instron Green Stress Degradation | | | |
| 200%, psi | 30 | 34 | 34 |
| 200% Integrator | 702 | 844 | 802 |
| 4 Min., psi | 9 | 10 | 10 |
| 4 Min., Integrator | 2450 | 2858 | 2785 |

RECIPE: SBR/NR/Black/Oil/ZnO/Stearic Acid/S/Accelerator plus 17 phr of resin as indicated.

The wind-up tack values and Instron green stress-strain data as well as Instron green stress degradation data on the experimental resins are all higher than on the control, using a commercial resin. Similar results would be obtained with the other experimental resins listed in Table IV.

In addition to the faster cure rates imparted to rubber compounds by the resins of this invention, we have unexpectedly discovered that the resins also impart antioxidant activity as indicated in Table VII which follows:

TABLE VII

STABILIZATION DATA

| | MOONEYS BEFORE AND AFTER OVEN AGING | | |
|---|---|---|---|
| | Original | 4 Days | 8 Days |
| Polymer Additive: None | 92 | Gelled | — |
| 2.0 phr Resin No.: | | | |
| 4 | 88 | 82 | 82 |
| 15 | 110 | 108 | 107 |
| 2.0 phr Commercial Antidegradant: | 76 | 98 | 112 |

As indicated by the data summarized in Table VII, 2.0 phr of resins Nos. 4 and 15 very effectively stabilized the Mooney viscosity of the polymer even after 8 days oven aging in a forced-air oven such as used in running standard laboratory stabilization tests. In contrast, the polymer containing no additive was completely gelled after 4 days aging. It is therefore completely useless from a commercial standpoint. It will be noted that the experimental resins gave Mooney viscosity retention values better than for the commercial antidegradent.

We claim:

1. A solid rubber tackifier or stabilizer resin which is the reaction product of 5 to 50 parts by weight of furfuraldehyde and 100 parts by weight of tire pyrolysis oil obtained by distillation of vulcanized tire scrap at a temperature in the range of 1000° to 2500° F. which oil has the following analysis (volume percent):

|  | PER CENT |
|---|---|
| Alkyl Benzenes | 15–25 |
| Phenols | 0.1–5 |
| 3-Ring Aromatics | 0.1–5 |
| Biphenyl and Acenanpthene | 5–25 |
| Alkyl Naphthalenes | 5–35 |
| Indenes | 1–20 |
| Styrene | 1–15 |
| Alkylstyrenes and Indans | 1–25. |

2. The method of producing a rubber tackifier and stabilizer resin which comprises reacting 5 to 50 parts by weight of furfuraldehyde and 100 parts by weight of tire pyrolysis oil obtained by distillation of vulcanized tire scrap at a temperature in the range of 1000° to 2500° F., at a temperature of −25° to 250° C. in the presence of a catalyst of the class consisting of sulfuric acid, p-toluene-sulfonic acid, the sulfur- and phosphorous-bridging condensation type catalysts and Friedel-Crafts type catalysts, which oil has the following analysis (volume percent):

|  | PER CENT |
|---|---|
| Alkyl Benzenes | 15–25 |
| Phenols | 0.1–5 |
| 3-Ring Aromatics | 0.1–5 |
| Biphenyl and Acenaphthene | 5–25 |
| Alkyl Naphthalenes | 5–35 |
| Indenes | 1–20 |
| Styrene | 1–15 |
| Alkylstyrenes and Indans | 1–25. |

* * * * *